Dec. 23, 1969  H. W. STIER  3,484,919
REVERSIBLE CUTTING INSERTS AND TOOL HOLDER FOR THE SAME
Filed Oct. 20, 1967  2 Sheets-Sheet 1

INVENTOR
HENRY W. STIER

BY Hauke, Kraus, Gifford, & Patalidis
ATTORNEYS

Dec. 23, 1969      H. W. STIER      3,484,919
REVERSIBLE CUTTING INSERTS AND TOOL HOLDER FOR THE SAME
Filed Oct. 20, 1967      2 Sheets-Sheet 2
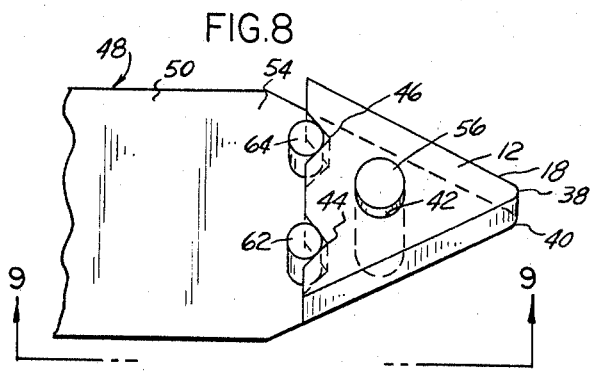
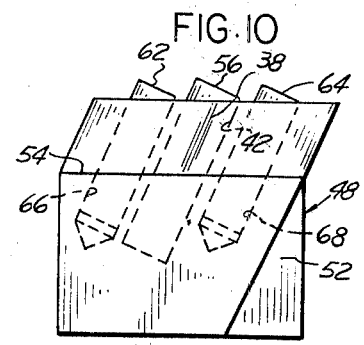
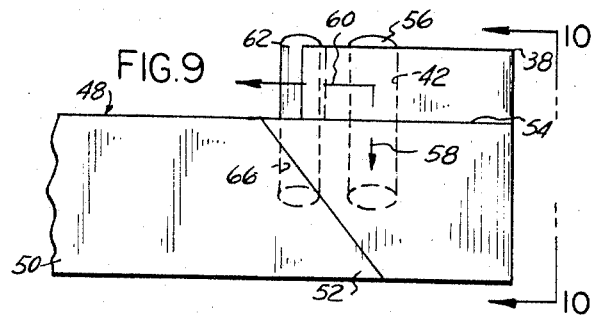
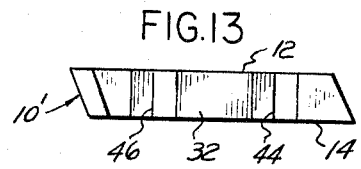
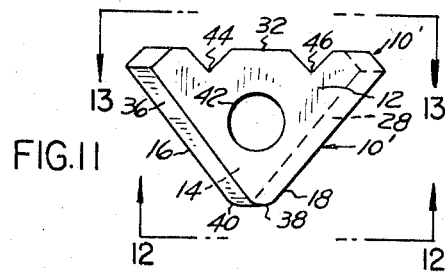
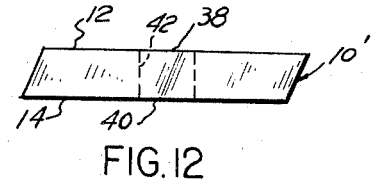
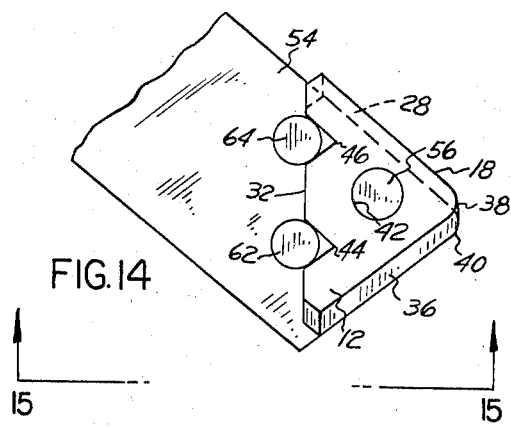
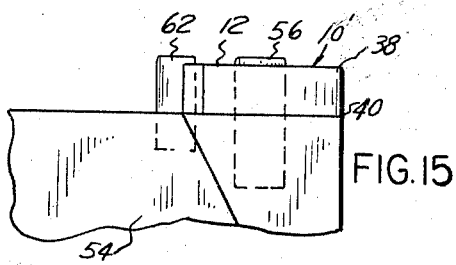
INVENTOR
HENRY W. STIER
ATTORNEYS

United States Patent Office

3,484,919
Patented Dec. 23, 1969

3,484,919
REVERSIBLE CUTTING INSERTS AND TOOL HOLDER FOR THE SAME
Henry W. Stier, Dearborn Heights, Mich., assignor to Carmet Company, Pittsburgh, Pa., a corporation of New Jersey
Filed Oct. 20, 1967, Ser. No. 676,949
Int. Cl. B26d 1/00
U.S. Cl. 29—96                       6 Claims

ABSTRACT OF THE DISCLOSURE

A reversible cutting insert of generally triangular shape and having a positive side rake as a result of the side faces of the insert being disposed at an angle other than 90° with respect to the upper and lower faces of the insert. Additionally, the insert is provided with a pair of parallel V-shaped notches disposed in the rear face thereof for appropriate indexing in a tool holder provided with locating and indexing pins adapted to engage the V-shaped notches of the insert, the tool holder having means for clamping the insert on a support surface while simultaneously causing the V-shaped notches in the rear face of the insert with the locating and indexing pins in the tool holder.

BACKGROUND OF THE INVENTION

The present invention relates to replaceable or throw-away cutting inserts made of ultra-hard materials such as carbides and the like, and having two cutting edges and points such that when one of the cutting edges or points becomes dull, the insert can be reversed or turned over and reinserted on a tool holder so as to present a sharp cutting edge and point to the workpiece. The insert geometry provides positive side rake, and the insert is preferably disposed on a holder in such a manner as to cut a workpiece with a negative back rake, such combination of positive side rake and negative back rake giving the best tool life.

As shown by United States Patent Nos. 3,066,385, 3,104,452, 3,137,918, 3,142,110, 3,226,797 and 3,289,271, cutting inserts having positive side rake have been known for some time, but they all present a rather complex geometry that contributes to difficulties in manufacturing the inserts with precision and makes them an expensive item to the purchasers. Furthermore, prior art positive side rake cutting inserts require non-conventional tool holders which are substantially difficult to manufacture with precision, which are more complicated than conventional tool holders and which are substantially more costly. The present invention provides a replaceable or throw-away cutting insert having two cutting edges and points consecutively usable by reversing the insert in a tool holder; cutting inserts according to the present invention may be used in combination with a tool holder that requires no pocket or recess for supporting the cutting insert therein and which permits clamping and locating of the cutting insert by simple inexpensive means.

SUMMARY OF THE INVENTION

The principal object of the invention, therefore, is to provide cutting inserts having positive side rake, which may be disposed in a tool holder so as to be provided with a negative back rake, which may be reversed when the cutting edge and point are worn so as to present a new cutting edge and point to the workpiece, which are located in the tool holder by simple means without requiring a recess or pocket for inserting the cutting insert therein, which provide a three point location and securing in the holder and which provides precision location of the nose of the inserts without requiring precision grinding of the inserts except with respect to V-shaped locating notches, which are easy and inexpensive to manufacture.

These and other advantages of the present invention will become apparent when the following description of some of the best modes contemplated to practice the invention is read in conjunction with the accompanying drawings wherein like numerals refer to like or equivalent parts and in which:

BRIEF DESCRIPTION OF THE DRAWINGS

FIG. 8 is a top plan view of the cutting insert disposed on a tool holder;

FIG. 9 is a side elevation view thereof, substantially from line 9—9 of FIG. 8;

FIG. 10 is a front elevation view thereof, substantially from line 10—10 of FIG. 10;

FIG. 11 is a top plan view of a modification of a cutting insert according to the present invention;

FIG. 12 is a front elevation view thereof substantially from line 12—12 of FIG. 11;

FIG. 13 is a rear elevation view thereof, substantially from line 13—13 of FIG. 11;

FIG. 14 is a top plan view of the cutting insert of FIGS. 11–12 mounted on an appropriate tool holder; and FIG. 15 is a side elevation view thereof substantially from line 15—15 of FIG. 14.

DETAILED DESCRIPTION OF THE PREFERRED EMBODIMENTS

Figure 1:
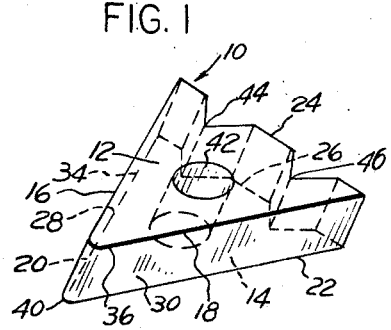
FIG. 1 is a perspective view of an example of a cutting insert according to the present invention.
Figure 2:
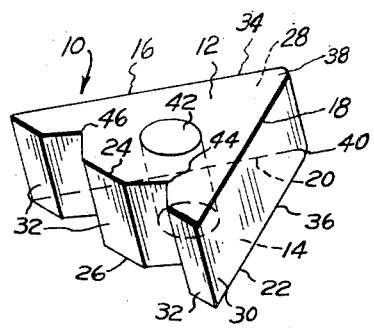
FIG. 2 is another perspective view of the cutting insert of FIG. 1 showing best the rear portion thereof.

Referring now to the drawings, and more particularly to FIGS. 1–6, representing an example of replaceable or throw-away reversible cutting insert according to the present invention, such insert consists of a prismatic block 10 of ultra hard material such as carbides and the like. The prismatic block 10 has two generally triangular parallel faces 12 and 14 each shaped as an isosceles triangle having two consecutive sides of equal length, shown at 16 and 18 with respect to face 12, and at 20 and 22 with respect to face 14, side 16 being parallel to side 20, and side 18 being parallel to side 22. The third sides of the triangular faces, shown at 24 with respect to face 12 and at 26 with respect to face 14, are also parallel. There is thus formed a rectangular side face 28 joining the parallel faces 12 and 14 between sides 16 and 20 and a rectangular side face 30 joining parallel faces 12 and 14 between sides 18 and 22. Between the sides 24 and 26 there is thus formed a substantially parallelogram shaped rear face 32 in a plane substantially perpendicular to the plane of parallel faces 12 and 14, while the side faces 28 and 30 are disposed with respect to the parallel faces 12 and 14 at an angle other than 90°. The cutting insert is thus provided with two cutting edges, shown respectively at 34 and 36, of substantially less than 90° each with a cutting tip or point, which in the drawing is shown as a rounded nose forming cutting points 38 and 40 respectively. The two cutting edges 34 and 30 are preferably of the same angle, and the cutting insert is normally mounted in a holder in such manner that one cutting edge and one cutting point are presented to a workpiece for cutting thereof until such cutting edge and/or point are worn, at which time the insert may be turned over so as to present the other cutting edge and cutting point to the workpiece.

The cutting insert hereto described may be used in the usual manner in a conventional tool holder having a pocket or recess with a backwall substantially at right angle to the bottom surface of the pocket or recess, such backwall being adapted to engage the rear face 32 of the insert when the insert is in an appropriate position in the pocket or recess in the tool holder, clamped therein by means forcing one of the parallel faces 12 or 14 against the bottom of the pocket or recess and the rear face 32 against the backwall of the pocket or recess. Preferably, however, a cutting insert according to the present invention is provided with a mounting hole or bore 42 having an axis substantially parallel to the sides 28 and 30, and two substantially symmetrically disposed parallel V-shaped notches 44 and 46, having their axes substantially parallel to the axis of bore 32. The V-shaped notches are ground in the rear face 32 of the prismatic block 10, as shown. The insert may thus be mounted on a tool holder 48, in the simple and effective manner shown at FIGS. 7–10.

The tool holder 48 comprises a substantially parallelepipedonal shank 50 having a triangular head 52 generally of the shape of the plane projection of the triangular insert, and having an upper surface 54 forming a support surface for one of the parallel faces 12 or 14 of the insert. A conventional eccentric pin or the like, as shown schematically at 56, projects within the mounting bore 42 of the cutting insert and thus forms a mounting and clamping means for the insert in an appropriate position on the tool holder head 52. The peripheral surface of eccentric pin 56 or the like frictionally engages the inner surface of mounting bore or hole 42 and is arranged to draw one of the faces 12 or 14 of the insert against the support surface 54 of the tool holder head 52, while at the same time urging the insert rearwardly, in the two directions shown by arrows 58 and 60 in FIG. 9, such that the V-shaped notches 44 and 46 in the rear face 32 of the insert are caused to be engaged respectively by parallel locating pins 62 and 64 fixedly disposed in appropriate oblique bores 66 and 68, best shown in FIG. 10, in the tool holder head 52. In this manner, the prismatic block 10 forming the cutting insert is precisely indexed, and precision grinding of the position and depth of the V-shaped notches 44 and 46 relatively to the cutting point or nose 38 or 40 of the insert permits obtaining precision inserts and consequently precision tooling with the least amount of grinding and without too much concern with respect to tolerances as to the actual geometric dimensions of the insert.

Figure 3:
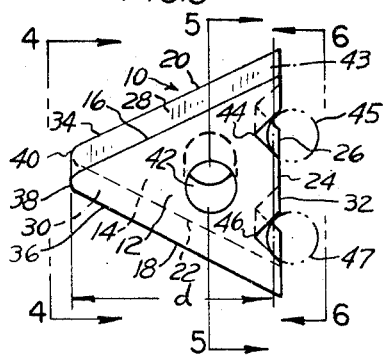
FIG. 3 is a top plan view of the cutting insert of FIGS. 1–2.
Figures 4, 5, 6:
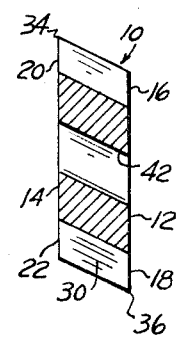
FIG. 4 is a front elevation view thereof substantially from line 4—4 of FIG. 3.
FIG. 5 is a transverse sectional view thereof substantially from line 5—5 of FIG. 3.
FIG. 6 is a rear elevation view thereof, substantially from line 6—6 of FIG. 6.

Such precision cutting inserts are obtained by controlling precisely, the distance d, FIG. 3, separating the insert nose 38 or 40 from an imaginary line passing by the points at which circles, such as shown at 45 and 47, of a diameter equal to the diameter of the parallel locating pins in the tool holder, are tangent to the sides of respectively the V-shaped notches 44 and 46.

Figure 7:
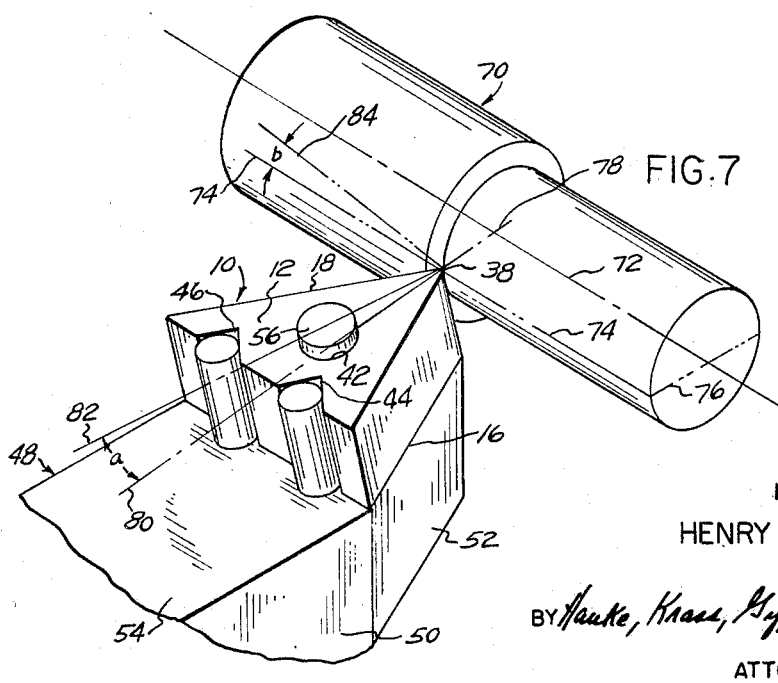
FIG. 7 is a schematic perspective view of the cutting insert of FIGS. 1–6 disposed on an appropriate tool holder shown during the turning of a workpiece.

As shown in FIG. 7 in a perspective schematic view, the cutting insert formed by prismatic block 10 is illustrated mounted on a tool holder 48 for turning a workpiece 70 mounted on a metal cutting lathe, not shown, for the sake of explaining a preferred way of a cutting insert according to the invention. Dot and dash line 72 arbitrarily represents the axis of the workpiece 70, and dot and dash line 74 is a line parallel to the axis 72 and passing through the cutting point 38 of the insert. Line 74 is thus a generatrix of the workpiece, or the locus described by the cutting tip or nose 38 of the insert 10 when the cutting tool is fed parallely to the axis of the workpiece for the purpose of removing material from the periphery thereof. Line 74 forms with radii 76 and 78 of the workpiece a plane having a slope line 80, line 80 as shown being a prolongation of radius 78. The slope of the upper face 12 of the cutting insert, or centerline of the face 12, is arbitrarily represented by line 82 which forms with slope line 80 an angle a. It can thus be seen that the insert is cutting the workpiece with a negative back rake angle a. Line 84 represents the slope of the face 12 of the insert in a plane including generatrix 74, such that the angle b formed between line 84 and 74 represents the positive side rake angle of the cutting insert, the cutting edge 18 being, as previously explained, of an angle less than 90°.

Referring now to FIGS. 11–13, there is shown a cutting insert formed in the shape of a prismatic block 10′, having parallel faces 12 and 13, generally triangular in shape. The prismatic block 10′ is of the general configuration previously described in detail with respect to the insert of FIGS. 1–6, although not geometrically quite alike in view of the fact that the consecutive equal sides of the isosceles triangles defining parallel faces 12 and 14 are disposed substantially at right angle to each other as shown. The cutting insert formed by prismatic block 10′ is, in the example illustrated, provided with a mounting hole or bore 42 having an axis substantially perpendicular to the plane of faces 12 and 14, and with V-shaped notches 44 and 46, in the rear face 42 of the insert, having their axes parallel to the axis of mounting hole or bore 42. In this manner, a tool holder 48, adapted to support such insert 10′ in an appropriate position for cutting of a workpiece, includes a mounting and clamping eccentric pin or the like as shown at 56 in FIGS. 14 and 15, adapted to draw the insert towards the mounting face 54 of the tool holder, while simultaneously drawing the insert rearwardly so as to cause the parallel pins 62 and 64 to engage respectively V-shaped notches 44 and 46. In the configurations for the insert and the tool holder shown in FIGS. 11–12 and 14–15, the bores accepting the locating pins 62 and 64 in the tool holder 48 and the eccentric pin 56 need not be at an angle with respect to the mounting surface 58, and it can thus be seen that the manufacturing of the cutting insert with V-shaped notches and a mounting hole substantially at right angle to the parallel faces 12 and 14 and the manufacturing of the tool holder is somewhat simplified.

In the preceding specification, detailed description of the mechanism provided for permitting the mounting pin 56 to simultaneously draw the cutting insert against the mounting surface on the tool head and the V-shaped notches in the rear face of the insert against the peripheral surface of the locating pins have not been described in detail, as several appropriate mechanisms are capable of effecting such purpose, some of which are described and claimed in co-pending patent application Serial No. 619,796.

Having thus described the invention by way of examples of practiced embodiments thereof, what is sought to be protected by United States Letters Patent is as follows:

1. A reversible cutting insert having two triangular equal parallel faces each shaped as a triangle having two equal sides and a third side, two substantially rectangular plane side faces disposed at an angle other than ninety degrees relatively to said parallel faces and joining the corresponding equal sides of each of said triangles, and a substantially parallelogram plane third face disposed at substantially right angle to said parallel faces and joining the third sides of said triangles, and means disposed in said third face to engage locating means in a holder for said cutting insert.

2. The cutting insert of claim 1 wherein said means to engage locating means is a pair of identical parallel substantially V-shaped notches formed in said third face each to closely engage a locating pin disposed in said holder.

3. The cutting insert of claim 2 further comprising a bore joining said parallel faces and axed substantially parallelly to said notches.

4. The cutting insert of claim 2 wherein an imaginary line passing by the points at which circles of a predetermined diameter are tangent to said V-shaped notches is located at a predetermined distance from the cutting tip of said insert defined by the junction of the equal sides of said tirangular parallel faces.

5. A holder for a reversible cutting insert having two equal parallel faces each shaped as a triangle having two equal sides and a third side, two substantially rectangular plane side faces disposed at an angle other than ninety degrees relatively to said parallel faces and joining the corresponding equal sides of each of said triangles, a substantially parallelogrm plane back face disposed at substantially right angle to said parallel faces and joining the third sides of said triangles, and a pair of identical parallel substantially V-shaped notches formed on said third face, said holder comprising a surface for engagement with one of said triangular faces of the cutting insert, a pair of parallel pins projecting from said surface for engagement in said V-shaped notches and clamping means for clamping said insert on said surface whilst simultaneously forcing said insert in a direction that firmly engages said V-shaped notches with the peripheral surface of said pins.

6. The holder of claim 5 wherein said clamping means comprises a pin frictionally engageable in a bore joining the parallel faces of said insert and axed substantially parallelly to said notches and means for drawing said pin simultaneously toward said parallel pins and said surface on said holder.

References Cited

UNITED STATES PATENTS

| | | | |
|---|---|---|---|
| 3,205,559 | 9/1965 | Greenleaf | 29—105 |
| 3,289,271 | 12/1966 | Stier | 29—95 |

HARRISON L. HINSON, Primary Examiner

U.S. Cl. X.R.

29—95